United States Patent [19]

Strimel

[11] 3,835,699
[45] Sept. 17, 1974

[54] LONG STROKE TESTING MACHINE
[75] Inventor: Robert S. Strimel, Penllyn, Pa.
[73] Assignee: Tinius Olsen Testing Machine Co., Inc., Willow Grove, Pa.
[22] Filed: Sept. 27, 1973
[21] Appl. No.: 401,203

[52] U.S. Cl. .................................................. 73/95
[51] Int. Cl. ............................................ G01n 3/08
[58] Field of Search ............................... 73/95, 103

[56] References Cited
UNITED STATES PATENTS
3,176,507    4/1965    Digesu et al. .......................... 73/103
3,447,363    6/1969    Goldfinger .............................. 73/95

*Primary Examiner*—Jerry W. Myracle
*Attorney, Agent, or Firm*—Frederick J. Olsson

[57] ABSTRACT

Machine for tension-testing specimens of the type which elongate or strain several times their original length.

8 Claims, 15 Drawing Figures

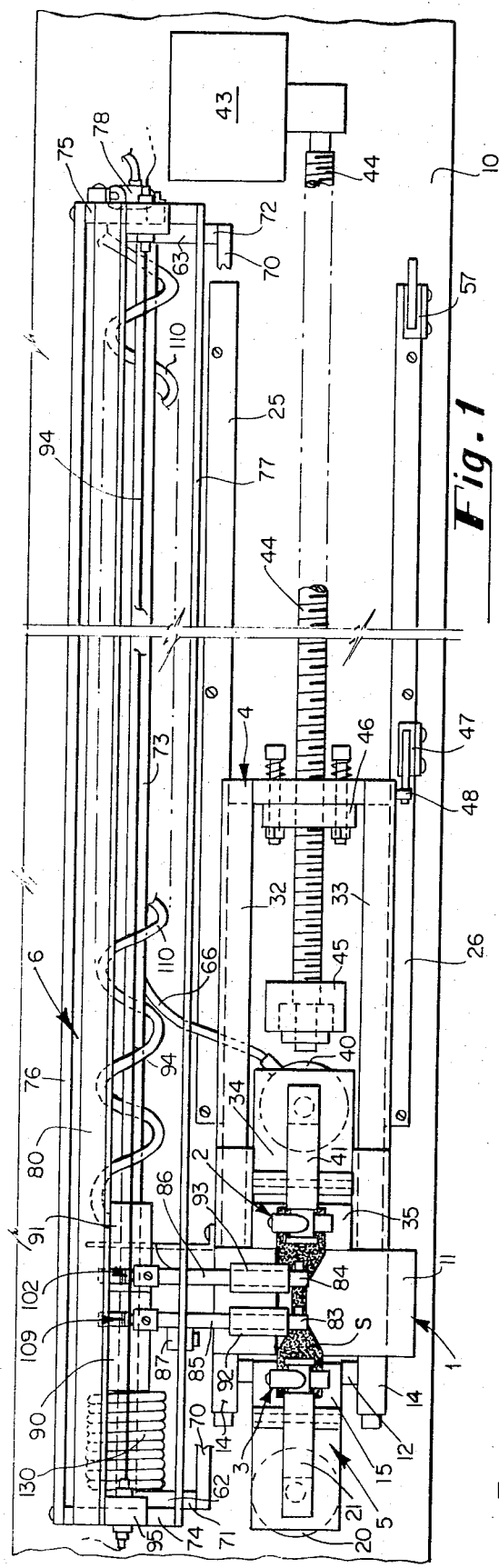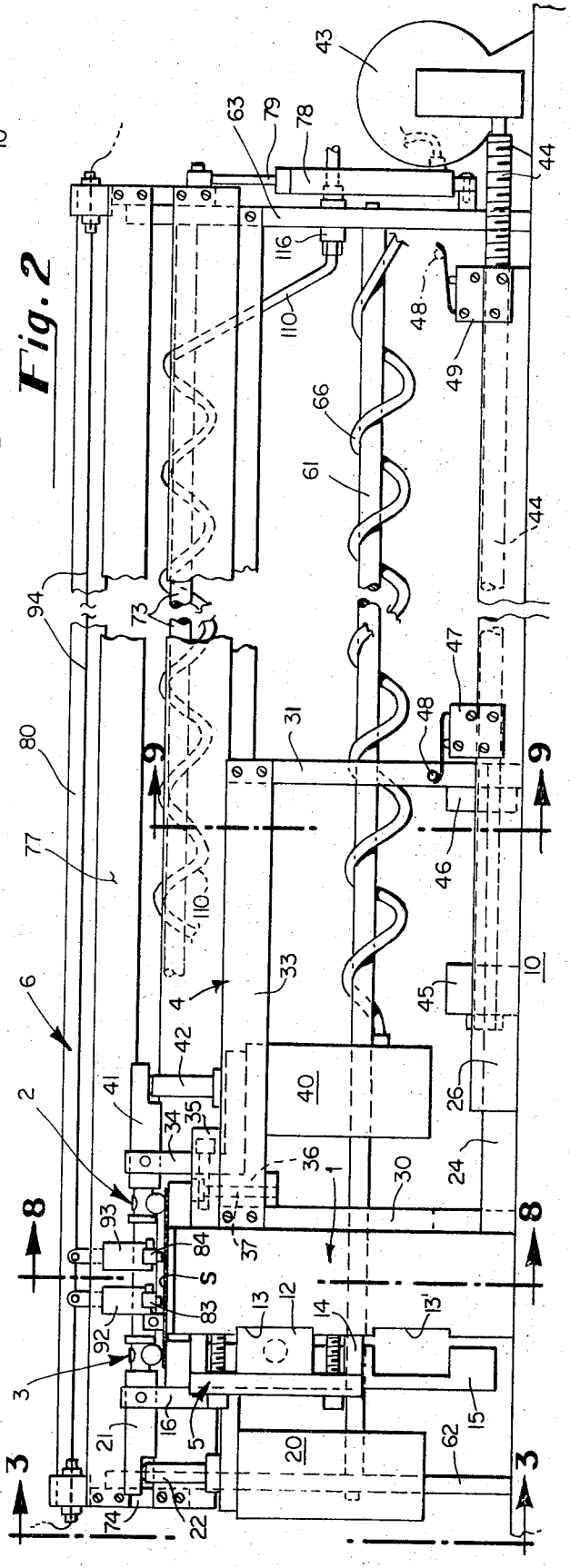

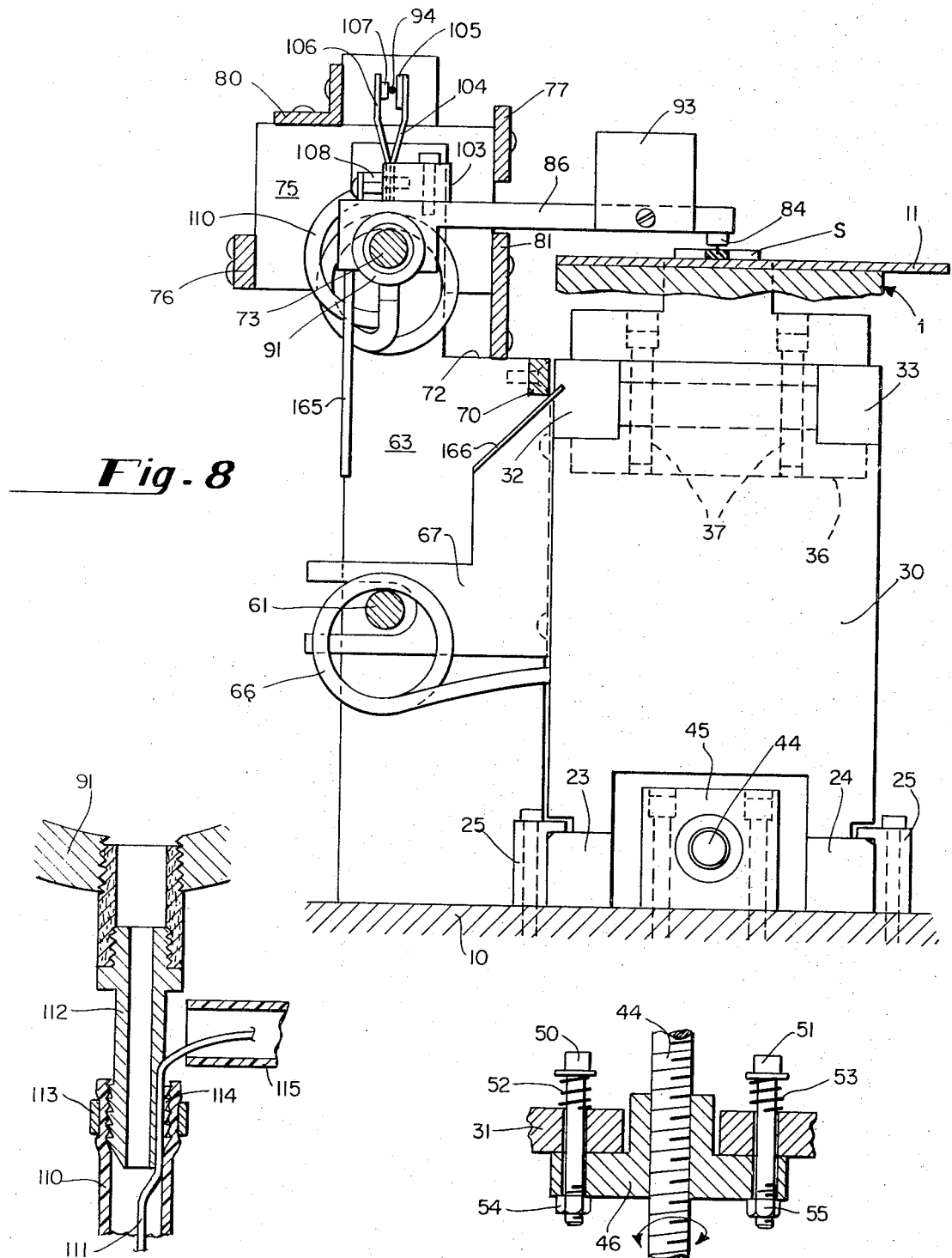
Fig. 8
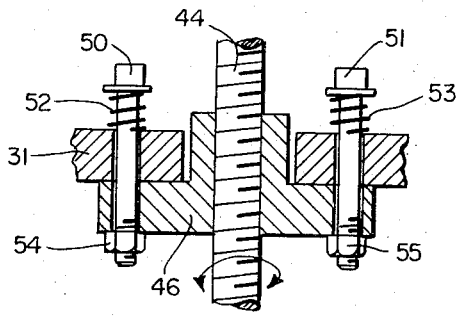
Fig. 5
Fig. 10

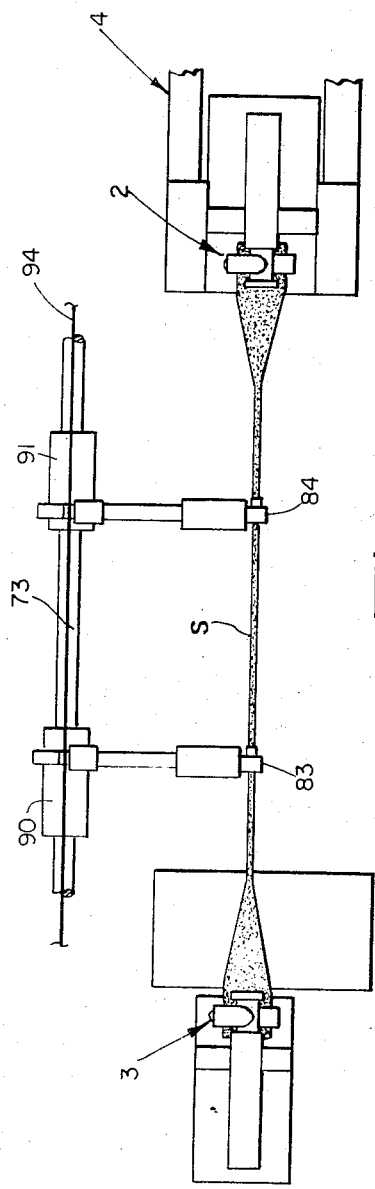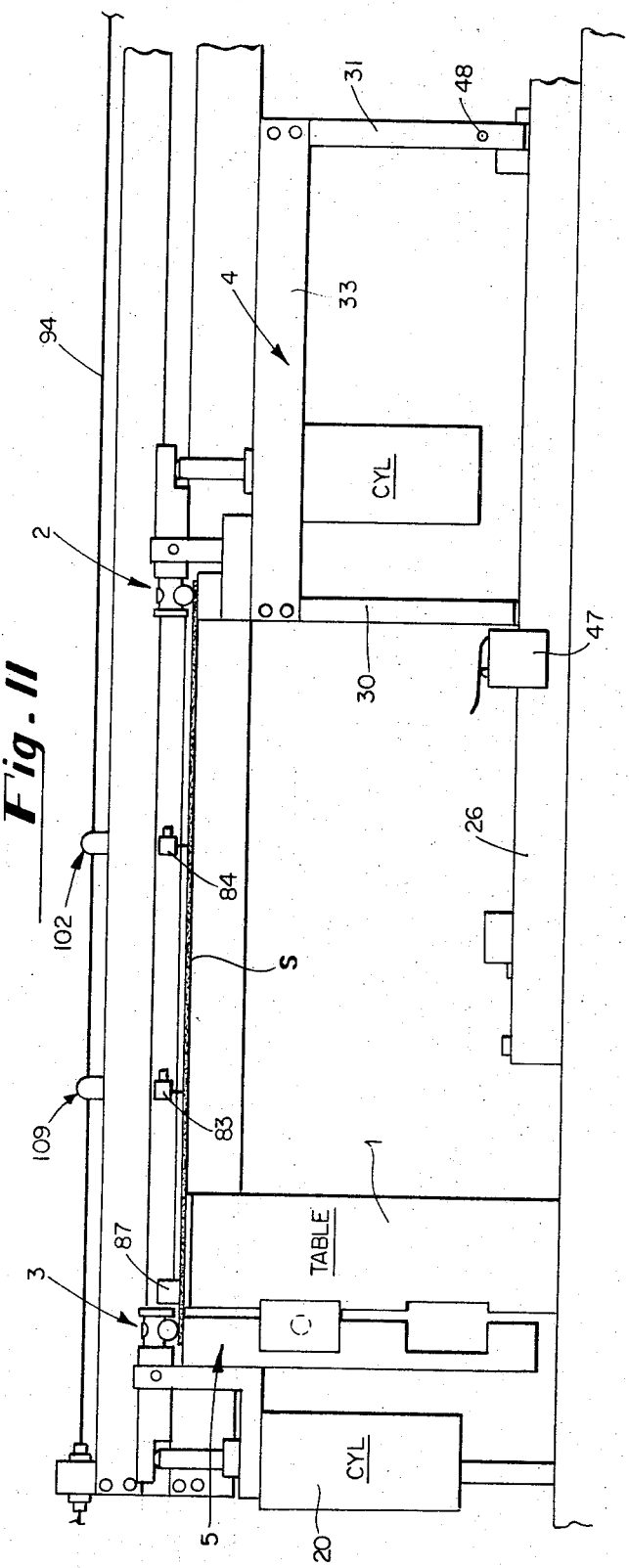

LONG STROKE TESTING MACHINE

This invention relates to physical testing machines particularly adapted for stressing specimens in tension and measuring the strain thereof.

More specifically, the invention relates to a horizontal tension testing machine especially adapted for testing specimens made from material which strains or elongates under load to several times original length but which can be readily used for testing short strain specimens.

The principal object of the invention is to provide an extensometer in association with a testing machine of the kind in question which accurately follows the large or small elongation and faithfully senses the amount of the same.

Various features and advantages of the invention will readily be apparent to those skilled in the art by reference to the following specification taken in conjunction with the accompanying drawings forming a part thereof it being understood that modifications may be made in the structural details shown therein and described within the scope of the appendent claims without departing from the scope and spirit of the invention.

FIG. 1 is a plan view of a testing machine embodying the invention;

FIG. 2 is a front elevational view of the machine of FIG. 1;

FIG. 5 is a view taken on the lines 5—5 of FIG. 4;

FIG. 8 is an enlarged elevational view taken on the lines 8—8 of FIG. 2.

FIG. 10 is a view taken on the lines 10—10 of FIG. 9;

FIG. 11 is a front elevational view of the machine of FIG. 1 with certain parts removed and illustrating a specimen strained several times its original length;

FIG. 12 is a fragmentary plan view of FIG. 11;

Figure 14:
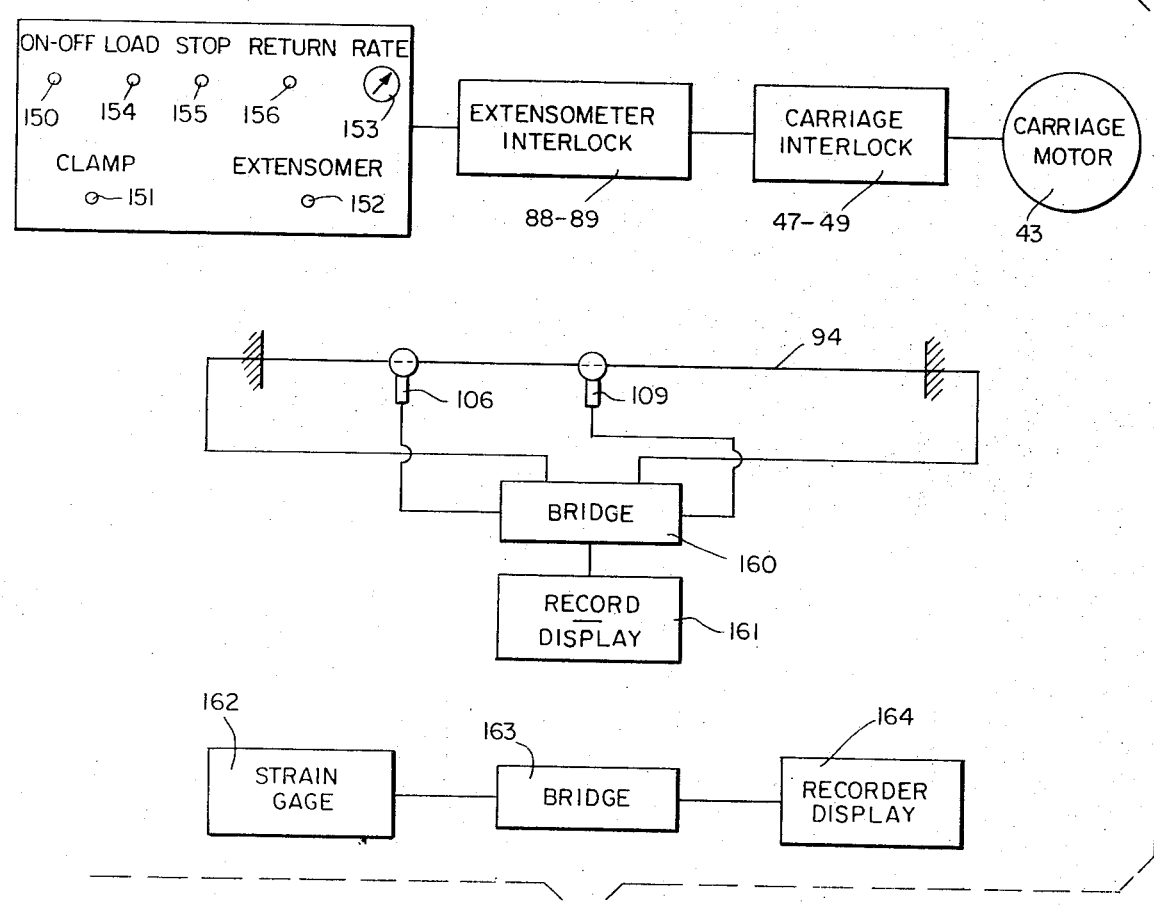

FIG. 14 includes diagrammatic views of the electrical system of the machine.

In FIGS. 1 and 2 a table for holding a specimen S as it is loaded into the machine is indicated at 1. A pair of clamps for gripping the opposite ends of the specimen are indicated at 2 and 3. The clamp 2 is mounted on a carriage 4, which is moved to the right to impose a tension load on the specimen while the other end of the specimen is gripped by the clamp 3. The clamp 3 is mounted on a load sensing unit 5 which is responsive to and measures the amount of the load or stress on the specimen. An extensometer for following and sensing the strain of the specimen during the test is indicated at 6.

The table 1 is fixed to the horizontally extending base 10. The top of the table has a platform 11 for positioning and supporting the specimen S while being secured by the clamps 2 and 3. The platform may include means for guiding or positioning the specimen so that it is aligned with respect to a vertical plane containing the axis along which the specimen is stressed.

Clamps 2 and 3 have the same construction as the clamps shown in my U.S. Pat. No. 3,721,119. The load sensing unit 5 is also similar in construction and function to its counterpart in said patent. The unit 5 includes the torque bar 12 fitted in a socket 13 in the table and secured by the clamps 14, a support 15 secured to the torque bar, a bracket 16 connected to the support 15 and mounting a piston-cylinder assembly 20, and also pivotally mounting the arm 21 carrying the clamp 3. When the piston rod 22 is in the up position as shown, the clamp 3 grips the specimen S against the top of the support 15. When the rod 22 is down, the weight of the arm rotates the clamp away from the specimen position. It will be noted that the table 1 includes an additional socket 13'. This is used for lowering the load rating of the machine.

The carriage 4 which supports the clamp 2 will next be described.

A pair of sliders 23 and 24 (FIGS. 8 and 9) are moveably mounted on the base 10. The motion of the sliders along the base is guided by the guides 25 and 26 secured to the base. End posts 30 and 31 are secured to opposite ends of the sliders 23 and 24. The tops of the end posts are tied together by the top bars 32 and 33. A bracket 34 is slideably mounted on the top bars by the cross piece 35. The cross piece 35 and bracket 34 can be secured in any position along the bars by the clamp 36, which is adapted to be tightened up by the screws 37.

The bracket 34 mounts the air cylinder-piston assembly 40 and also pivotally supports the arm 41 carrying the clamp 2. When the piston rod 42 of the assembly 40 is in the up position, the clamp 2 secures one end of the specimen against the cross-piece 35. The adjustment feature of the bracket provides a means for accommodating specimens of various lengths without disturbing the start-test position of the carriage 4.

The carriage 4 is adapted to be moved along the base by the drive mechanism described following.

A motor 43 supported on the base 10 mounts one end of a drive screw 44. The other end is rotatably supported by the bearing assembly 45. The axis of the drive screw is aligned to be in the plane containing the axis along which the specimen is stressed. The motor 43 is reversible so that the screw can rotate in opposite directions. The nut assembly 46 is mounted on the end post 31.

As shown in FIGS. 1 and 2, the carriage is in the start-test position wherein the left-hand end post 30 is engaged with the table 1. To apply tension to the specimen, the carriage is moved to the right away from the table as is indicated in FIG. 11.

The start-test position of the carriage is determined by a switch 47, which is actuated by a finger 48 on the post 31. The switch cuts off power to the motor and thus stops the screw. The maximum permissable travel for the carriage away from the table is determined by the switch 49 which is also adapted to be actuated by the finger 48 and cuts off the power to the motor 43.

When the carriage returns to the start-test position screw 44 may continue to rotate somewhat after the switch 47 is actuated. To avoid the carriage loading the table, I have mounted the nut on the post 31 to accommodate screw overrun. The manner in which this is done is shown in FIG. 10. A pair of bolts 50 and 51 extend through the end post 31 and the nut 46. Between the head of each bolt and the post 31 are compression springs 52 and 53. The nuts 54 and 55 are respectively threaded on the ends of the bolts and bear on the post 31. The bolts 50 and 51 prevent rotation of the nut 46 so that rotation of the screw moves the post 31 and hence the carriage. However, when the post 31 engages the table 1 at the start-test position, any screw overrun will simply cause the nut 46 to move along the screw. The motion is accommodated by the space between the heads of the bolts and the post.

The air supply system for the cylinders 20 and 40 will next be described.

For all practical purposes the cylinder 20 is fixed and so the supply of air to the same offers no problem. Air is supplied to the cylinder 20 via the air supply line 60 (see FIG. 3). However, in as much as the cylinder 40 moves back and forth, the air supply is arranged in a unique manner. For this purpose, I have provided a support rod 61 (FIG. 2), which extends parallel to the base and is mounted at its opposite ends by the standards 62 and 63. The standards are respectively secured to the base 10 by L-shaped brackets not shown. An air supply line 66 is connected to the cylinder 40 and is wrapped around the rod 61 in a helixlike form. The line extends to an appropriate air supply system which will be mentioned later. The line 66 is preferrably made of a thermo-plastic material and before assembly as shown is wound into a helical form and dipped into hot water so that upon cooling it will take a permanent set. The helical form is important because as the carriage moves away from the table during the test, it allows the air line to contract into a smaller helix without disturbing the supply of air. To insure that the tube contracts into a helix, I have provided a pusher 67 (FIG. 8) which extends over the rod 61 within the area encompassed by the helical form of the tube. As will be apparent, when the carriage moves to the right as viewed in FIG. 2, the pusher will force the tube to contract into a smaller helix.

One of the most important parts of the invention is the extensometer 6 which follows the strain of the specimen and accurately senses the strain so that the amount of strain can be recorded and/or displayed. The extensometer mechanism will next be described.

The standards 62 and 63, mentioned above, support the extensometer 6. The standards are locked to the base 10 by the brackets not shown. The standards are connected together at the top by the tie bar 70.

Figure 3:
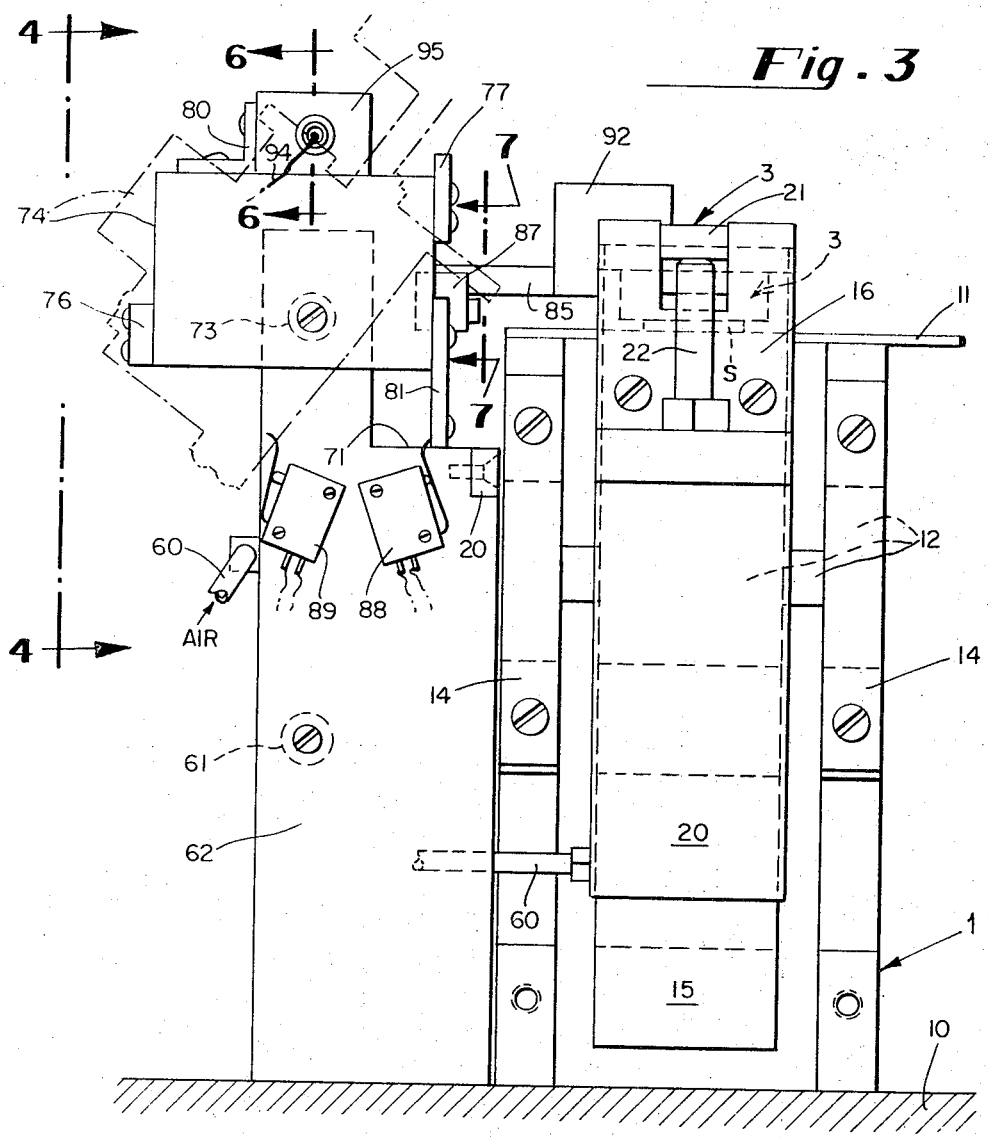
FIG. 3 is an enlarged view taken on the lines 3—3 of FIG. 1.
Figures 4, 4A, 9:
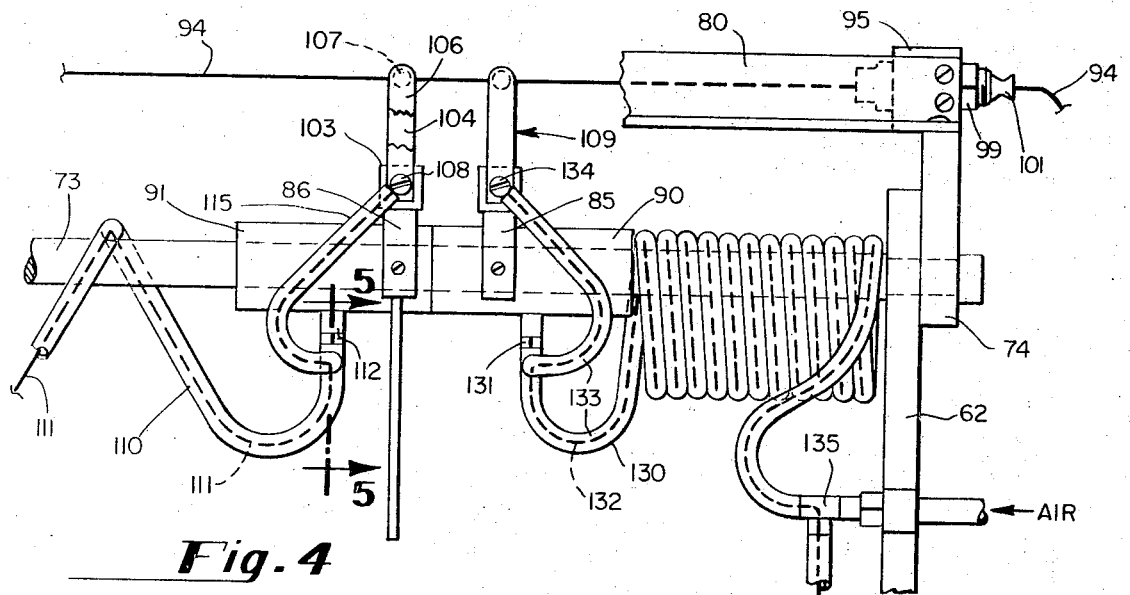
FIG. 4 is an enlarged fragmentary view taken on the lines 4—4 of FIG. 3, the view looking at the rear of the machine.
FIG. 4a is an enlarged sectional view of a fitting for the air and electrical systems.
FIG. 9 is an enlarged elevational view taken on the lines 9—9 of FIG. 2.

As best noted in FIG. 3, the standard 62 has a shoulder 71 and, referring to FIG. 8 and 9, the standard 63 has a similar shoulder 72. The shoulders 71 and 72 are co-planar.

The standards 62 and 63 carry a shaft 73. The shaft 73 rotatably mounts a pair of end pieces 74 and 75. The end pieces are connected by the flat cross-bars 76 and 77, by the angle-bar 80 and by the flat lift-bar 81. The bars rigidly tie the end pieces together and the assembly forms a cradle. The cradle can be rotated about the axis of the shaft 73. The down, or operative, position of the cradle is shown by the full lines and is determined by the engagement of the lift-bar 81 with the shoulders 71 and 72. The up, or inoperative position, shown by the dotted lines in FIG. 3 is determined by the engagement of the bar 76 with the standards 62 and 63.

Rotation of the cradle is controlled by a spring-return type air cylinder 78, pivotally mounted on the standard 63 (FIG. 9). The rod 79, connected to the piston inside of the cylinder, is pivotally mounted on the end piece 75. When air is admitted to the cylinder, the rod is pulled down so that the cradle rotates up to the inoperative position. When air is exhausted, the spring inside of the cylinder pushes the rod up so that the cradle assume the down, or operative, position as shown.

The cradle mounts the strain followers 83 and 84, which in the down position of the cradle are adapted to contact the specimen and then follow the elongation as the load is applied. When the cradle is in the up, or inoperative, position, the followers are spaced away from the specimen. In the embodiment shown, the followers are in the form of pins which are capable of piercing a specimen made of rubber or the like. However, other type followers such as the knife edge type are contemplated. The followers include the mounting arms 85 and 86, which extend above the lift bar 81. The arm 85 is connected to an air bearing 90 while the arm 86 is connected to an air bearing 91. The air bearings are mounted on the shaft 73 and are independently rotatable on the shaft and moveable in translation along the shaft.

The followers 83 and 84 are biased in a direction toward the specimen by the respective weights 92 and 93. The weights are effective in causing the followers to pierce a specimen and to maintain the same in contact with the specimen as the test proceeds.

With reference to FIG. 8, it will be apparent that when the cradle is rotated to the up position, the lift bar 81 will pick up the arms 85 and 86 and the arms, followers and air bearings will rotate with the cradle.

Rotation of the cradle operates a pair of inter-lock switches which permit energizing of the carriage motor 43 for testing only when the followers are in the operative position and for return of the carriage after the test only if the cradle and followers are rotated upwardly to the inoperative position. Thus, when the cradle is down in the operative position (FIG. 3) the switch 88 will be actuated by the bar 81. The switch is connected in the motor circuit to permit operation. When the cradle is in the up, in the operative position, the switch 89 will be actuated by the side piece 74. The switch is connected in the motor circuit to permit return of the carriage.

During a test, the strain followers 83 and 84 are free from restriction so that they can accurately follow the strain of the specimen. With reference to FIG. 8, it will be noted that in the down, or operative, position the arm 85 is spaced slightly above the top of the bar 81. The bar, therefore, will not impose any frictional restraint. Also, the air bearings 90 and 91 float on a band of air around the shaft 73 and, therefore, are essentially friction free.

As noted in FIGS. 1 and 2, the air bearings 90 and 91 are abutting one another. The arms 85 and 86 are set up on the bearings so that they can be adjusted axially to set up the desired guage length for the followers. In connection with setting up gauge length, I have provided a slider 87 mounted in the lift bar 81 to be engaged by the arm 85. The slider can be adjusted to fix the desired position of the follower 83.

The mechanism of the extensometer for determining the actual amount of follower movement or strain of the specimen will next be described.

Figure 6:
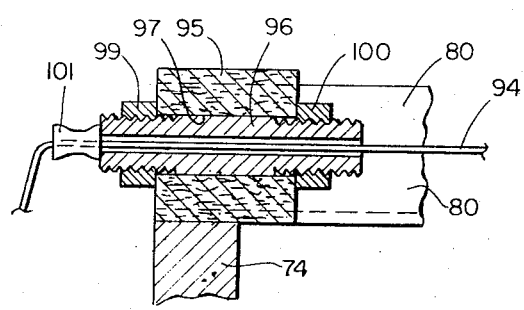
FIG. 6 is a view taken on the lines 6—6 of FIG. 3.

Just above, and extending parallel to the shaft 73, is an electrical resistance type slide wire 94 which is mounted on the end pieces 74 and 75. The manner in which the arm is mounted is best shown in FIG. 6. The end piece 74 carries an insulator block 95 secured to the angle rod 80 (FIG. 3). The block 95 has a bore within which is disposed a fitting 96, having an axial bore accomodating the wire 94. A pair of nuts 99 and 100 are threaded on the fitting and bear against the block 95. A clamp 101 is fixed on the wire and bears against the fitting. An identical arrangement supports the wire 94 on the end piece 75.

It will be seen that by loosening the nut 101 and tightening the nut 100, the fitting 96 can be urged to the left and, through the medium of the clamp 102, pull the wire taut. The position is maintained by tightening up the nut 101. In as much as the slide wire is mounted on the side pieces 75 and 75, the wire partakes of the cradle motion as between the operative and inoperative positions.

The slide wire 94 is contacted by a pair of current carrying sliders mounted on the air bearings and therefore follow the specimen elongation. Current flow through the wire changes as the specimen elongates due to the sliders relatively moving apart. This change represents the elongation. The slider mechanisms connect the wire to a measuring device which drives a recorder or display unit. The slider mechanisms are described below.

With reference to FIGS. 4 and 8, the slider 102 on the air bearing 91 comprises the insulated block 103 mounted on the arm 85 and the slide arm 104 connected to the block. The slide arm 104 extends upwardly to make electrical contact with the slide wire 94. The arm 104 is made of tempered copper so that it has a spring-like characteristic and the actual contact is made through the medium of a silver pad 105.

To maintain the contact with the slide wire 94, a contact pressure arm 106 is connected to the block and extends upwardly toward the slide wire and has a nylon button 107 which bears on the wire. The arm 106 is also made of tempered copper. The arms are configured so that in the absence of the engagement with the wire, the arm 104 would normally be bent to the left (FIG. 8) and the arm 106 would normally be bent to the right. As noted, the arms are held on the block 103 as by the screw 108.

An identical slider 109 is mounted on the air bearing 90.

Due to the elongation, the air bearing 91 and slider 102 will have considerable movement and the arrangement for supplying air to the bearings and maintaining electrical contact during the elongation is an important part of the invention. This is described fllowing.

As best noted in FIGS. 1 and 4, the plastic tube 110 is wound in a helical fashion around the shaft 73. The tube extends from a point adjacent the standard 63 (where it is connected to an air supply as explained later) to the bearing 91. The tube not only carries air, but in addition, serves as an insulated conduit for the wire 111 which connects the slider 102 into the electrical recording or display system.

The manner of connecting the air tube 110 and the wire 111 is best illustrated in FIG. 5.

The bearing 91 supports an air fitting 112 and the end of the tube 110 fits over the fitting and is secured to the same by the clamp 113. A slot 114 is formed in the fitting to accommodate the passage of the wire 111 out of the end of the tube. The clamp fits tightly and prevents air loss. The wire then extends upwardly through the spaghetti 115 where it is connected to the arm 104 by the screw 108.

The opposite end of the tube 110 and the wire 111 are connected into the air and electrical systems as noted following:

With reference to FIGS. 9 and 2, the tube 110 and wire 111 are joined to a T-fitting 116 mounted on standard 63. The head 120 is slotted to accommodate passage of the wire. A clamp 121 holds the tube in place and makes the same airtight. The head 122 is plugged against passage of air. The head 122 mounts spaghetti 123 which carries wire 111. The spaghetti is held by clamp 124. The head 125 carries tube 126 held by clamp 127.

The air bearing 90 and the slider 109 are respectively connected to the air and electrical systems by an arrangement which is similar to that just described.

Referring to FIG. 4, the tube 130 is helically wound around the shaft 73 and is joined to a fitting 131 for supplying air to the bearing. This fitting is similarly as the fitting 112 on the bearing 91. The tube carries a wire 132 which runs thru a slot in the fitting 131 and exits upwardly through the spaghetti 133 where it is connected to the slider 109 by the screw 134. The other end of the tube is connected to a fitting 135 similar to the fitting 122 explained in connection with FIG. 4A to connect the air tube with the air system and the wire with electrical system.

The tube 130 is wound in a contracted position as shown in FIG. 4 in as much as the air bearing 90 during a test will normally have some motion toward the left as viewed in FIG. 4 so that the helical form of the tube 130 will expand.

The machine described herein is set up for manual operation and the sequence of operation will be described in connection with the air and electrical systems as diagrammatically represented in FIGS. 13 and 14.

Figure 13:
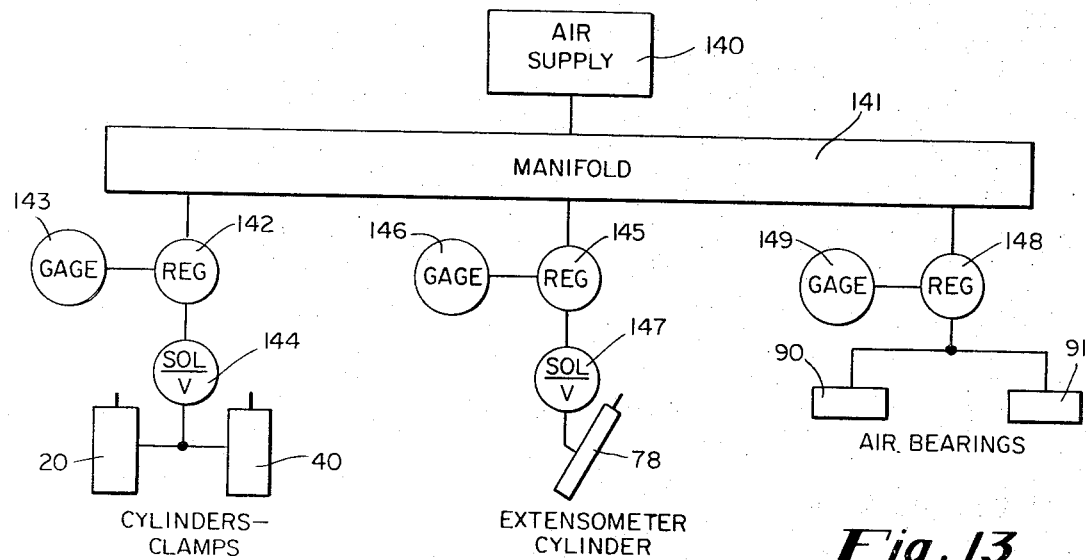
FIG. 13 is a diagrammatic view of the air system for the machine.

In FIG. 13, an air supply 140 is connected to a manifold 141. The manifold feeds a air regulator 142 connected to gauge 143 and to solenoid valve 144. When the solenoid is energized, the valve operates to supply air to the cylinders 20 and 40 for operating the clamps 2 and 3.

The manifold also feeds a regulator 145 connected to gauge 146 and also connected to the solenoid valve 147 which, in turn, is connected to the extensometer cylinder 78. When the solenoid 147 is energized, the valve supplies air to the cylinder and when it is de-energized lets the cylinder bleed to atmosphere.

The manifold 141 also supplies a regulator 148, connected to gauge 149 and is also connected to the air bearings 90 and 91. As will be noted, the air supply to the bearings is continuous.

At the start of a test, the carriage 4 is butted up against the table 1 as shown in FIG. 1. The extensometer is in the inoperative position and the clamps 2 and 3 are in the up position. The operator makes sure that the air bearings 90 and 91 are in abutting relationship and that the arm 85 on the bearing 90 is engaged with the stop 87. The operator then places a specimen on the platform 11 and then turns the on-off switch 150 to the on position to supply power to the machine. He then presses the clamp button 151 which causes the solenoid valve 144 to operate to supply air to the cylinders 20 and 40 to cause the clamps to grip the specimen. The extensometer button 152 is then activated to cause the cylinder 78 to rotate the cradle and followers downwardly to the operative position. The interlock switch 88 is activated to permit motor operation to move the carriage for the test.

The rate dial 153 having been set to establish the rate of loading, the load button 154 is actuated to energize the carriage motor and cause the carriage to start to move to the right to load the specimen.

When the specimen ruptures, the operator may push the stop button 155 to stop the motor or may wait until the switch 49 is actuated. In either case, the extensometer botton 152 is then actuated to cause the solenoid valve 147 to bleed the extensometer cylinder 78 so that the extensometer then rotates to the up position. The interlock switch 89 will be actuated to permit motor operation to return the carriage. The return button 156 is then actuated which will cause the carriage to move back or return to the start position.

Typical mechanism for indicating strain is diagrammatically shown in FIG. 14. The sliders 102 and 109 and ends of the slide wire 94 are connected to the bridge 160. The bridge drives a record/display device 161. The device 161 may be a conventional recorder or a digital display unit. FIG. 14 also diagrammatically shows conventional mechanism for indicating load namely that the strain gauges 162 in the torque bar 12 are connected to a bridge driving a record/display device 164.

Before closing I want to point out two additional important features of the extensometer 5.

One is that the strain followers are automatically returned to the proper gauge length after a test is completed. This is explained following.

Figure 7:
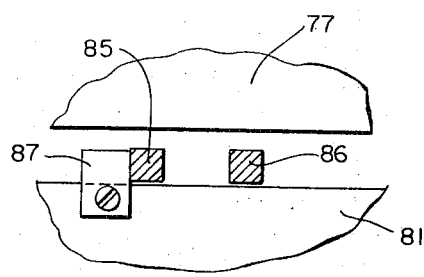
FIG. 7 is a view taken on the lines 7—7 of FIG. 3.

A rod 165 (FIG. 8) is carried by the air bearing 91. When the extensometer is in the operative position as shown the rod is displaced outwardly from the line of motion of the pusher 67 and particularly from the line of motion of the abutment 166 on the pusher. However, when the extensometer is rotated upwardly to the inoperative position the rod 165 extends into the line of motion of the abutment 166. Thus, at the end of a test when the extensometer is rotated upwardly and the carriage starts to return, the abutment 166 engages the rod 67 and pushes the rod and its attached air bearing 91 along the shaft 73. As the carriage nears the start position the bearing 91 engages the bearing 90 and pushes it along the shaft. This motion continues until the follower arm 85 engages the slider 87 (FIGS. 1 and 7). At this point the followers 83 and 84 are set up at the desired gauge length. The slider 87 is adjusted on the bar 81 so that the contact with the arm 85 takes place at the time the carriage is in the start position.

Another feature is that while the extensometer 5 has been described in terms of specimens having large strain it will be apparent to those skilled in the art that the arrangement is usable in applications where the specimens exhibit small strains. With small strains the ability to accurately follow the strain and to sense the amount of the same remains intact.

I claim:

1. In a testing machine for testing specimens of the type which strain substantially under load:
    means for mounting a specimen and for applying a load to the specimen along an axis;
    a shaft extending parallel said axis;
    a pair of air bearings mounted on said shaft with freedom for translatory motion along the shaft and for rotation about the shaft;
    a pair of strain followers respectively connected to the air bearings;
    an elongated strain cradle, the shaft supporting the cradle for rotation about the shaft axis;
    means to rotate the strain cradle as between an operative position and an inoperative position;
    means interconnecting the cradle and the followers and providing that in the inoperative position the followers are spaced away from and out of contact with the specimen and further providing that in the operative position, the followers are in contact with the specimen to respectively relatively move in accordance with the specimen strain, the latter motion being permitted by translatory movement of the air bearings along said shaft which thereby move in accordance with specimen strain;
    an elongated electrical resistance slide wire supported on the cradle to partake of said cradle rotation and extending generally parallel said axis; and
    a pair of electrical current-carrying sliders respectively mounted on the air bearings and each making electrical contact with said slide wire, said translatory motion of the air bearings causing the sliders to move along the wire in accordance with the strain of the specimen.

2. A construction in accordance with claim 1 wherein each said slider comprises:
    an insulator block mounted on an air bearing;
    a slide arm for carrying electrical current connected to the block and extending from the block to the slide wire and making electrical contact with the wire; and
    pressure means connected between said slide wire and engaging the wire and exerting pressure on the wire to maintain the wire in firm contact with said slide arm.

3. A construction in accordance with claim 1 wherein the slide wire is connected to the cradle at two spaced-apart points, each connection comprising:
    an insulator block mounted on the cradle and having an axial opening;
    a fitting having an axial bore through which extends the slide wire, the fitting being disposed in the block opening and having exterior threads adjacent each end;
    a pair of nuts respectively mounted on said threads and securing the fitting in the block; and
    a clamp on the wire, the clamp tightly engaging the wire and being in abutting relationship with one of said nuts for use in maintaining the wire taut.

4. A construction in accordance with claim 1 further including:
    a first plastic air tube spirally wound around said shaft;
    a conductor in said first tube;
    means connecting the first tube to one of the air bearings to deliver air thereto, said means providing for the conductor to exit from the tube and extend to the slider on the air bearing; and means connecting the conductor to the slider.

5. A construction in accordance with claim 4 further including:
a second plastic air tube spirally wound around said shaft;
a second conductor in said second tube;
means connecting the second tube with the other air bearing to deliver air thereto, said means providing for the second conductor to exit from the tube and extend to the slider on the other air bearing; and
means connecting the conductor to the slider.

6. A construction in accordance with claim 1 wherein:
said means for mounting and applying a load to the specimen includes a carriage, drive means for moving the carriage away from a start-test position whereby to impose said load on the specimen and for moving the carriage back to the start-test position and an abutment on the carriage and moveable therewith;
said construction further including a slider on said cradle to be interengaged with one of the air bearings when the bearings are in gage length position and a rod connected to the other air bearing and extending from the bearing so that in the operative position of the cradle, the rod is displaced from the line of motion of the abutment and so that in the inoperative position of the cradle, the rod extends into the line of motion of the abutment whereby motion of the carriage in returning to the start position causes the abutment to engage the rod and push said other air bearing along said shaft whereby to cause the other bearing to engage said one air bearing and push the same along the shaft until said one bearing interengages said slider.

7. A construction in accordance with claim 6 further including:
a specimen clamp and an air cylinder and piston assembly mounted on the cradle, the piston being connected to the clamp for operating the same;
means mounting a support rod, the rod extending generally parallel of the line of motion of the carriage;
an air tube helically wound around the rod and connected to the cylinder for supplying air thereto; and a pusher on the carriage extending over said rod and operative, when the carriage moves away from start position during the test, to push said tube into a contracted helical form.

8. In a testing machine for testing specimens which strain substantially under loads, including:
a horizontally extending base;
a pair of spaced-apart standards connected to and extending upright from the base;
an elongated shaft extending horizontally between and connected to said standards;
a support rod disposed below said shaft and extending horizontally between and connected to said standards;
a pair of end pieces respectively disposed on said shaft;
a plurality of cross bars extending between and connected to said end pieces and tying the end pieces together and forming a cradle, the connection between the end pieces and the shaft providing for the cradle to rotate about the axis of the shaft;
a lift bar extending between and connected to said end pieces and rotatable with the cradle;
a pair of air bearings mounted on said shaft with freedom for translatory motion along the shaft and for rotation about the shaft and extending over said lift bar;
a pair of strain followers respectively connected to said air bearings;
means to rotate the cradle as between an operative and an inoperative position, said lift bar engaging said followers when the cradle rotates to the inoperative position whereby to space the followers away from and out of contact with the specimen and disengaging from the followers when the cradle rotates to the operative position whereby the followers are in contact with the specimen to respectively, relatively move in accordance with specimen strain, the latter motion being permitted by translatory movement of the air bearings along said shaft which thereby move in accordance with specimen strain;
an elongated, electrical resistance slide wire mounted on the cradle to partake of the cradle rotation and extending generally parallel said axis; and
a pair of electrical current carrying sliders respectively mounted on the air bearings each making electrical contact with said slide wire, said translatory motoin of the air bearings causing the sliders to move along the slide wire in accordance with the strain of the specimen.

* * * * *